(12) United States Patent
Iida

(10) Patent No.: US 8,143,859 B2
(45) Date of Patent: Mar. 27, 2012

(54) POWER SUPPLY APPARATUS FOR VEHICLE

(75) Inventor: Takahide Iida, Kariya (JP)

(73) Assignees: Toyota Jidosha Kabushiki Kaisha, Toyota (JP); Kabushiki Kaisha Toyota Jidoshokki, Kariya-shi (JP)

( * ) Notice: Subject to any disclaimer, the term of this patent is extended or adjusted under 35 U.S.C. 154(b) by 351 days.

(21) Appl. No.: 12/451,163

(22) PCT Filed: May 30, 2008

(86) PCT No.: PCT/JP2008/060410
§ 371 (c)(1),
(2), (4) Date: Oct. 28, 2009

(87) PCT Pub. No.: WO2008/149964
PCT Pub. Date: Dec. 11, 2008

(65) Prior Publication Data
US 2010/0141213 A1      Jun. 10, 2010

(30) Foreign Application Priority Data
Jun. 6, 2007    (JP) .................................. 2007-150720

(51) Int. Cl.
*H01M 10/46*    (2006.01)

(52) U.S. Cl. ..................................................... 320/134

(58) Field of Classification Search .................. 320/104, 320/107, 127, 128, 134, 136; 363/84, 87, 363/89
See application file for complete search history.

(56) References Cited

U.S. PATENT DOCUMENTS

| 6,608,396 B2 | 8/2003 | Downer et al. |
| 6,710,575 B2 | 3/2004 | Youn |
| 2004/0207205 A1 | 10/2004 | Kikuchi et al. |
| 2007/0274113 A1* | 11/2007 | Wang et al. ................... 363/109 |

FOREIGN PATENT DOCUMENTS

| JP | A 2002-10502 | 1/2002 |
| JP | A 2003-209969 | 7/2003 |
| JP | A-2003-309997 | 10/2003 |
| JP | A 2004-25979 | 1/2004 |
| JP | A 2004-320872 | 11/2004 |
| JP | A 2004-320877 | 11/2004 |
| JP | A 2005-33898 | 2/2005 |
| JP | A 2005-80318 | 3/2005 |
| JP | A 2006-197691 | 7/2006 |
| RU | 2 025 862 C1 | 12/1994 |
| WO | WO 2005/105511 A1 | 11/2005 |

OTHER PUBLICATIONS

Decision on Grant for Corresponding Russian Patent Application No. 2009149698, mailed on Aug. 27, 2010 (w/ English translation).

* cited by examiner

*Primary Examiner* — Edward Tso
(74) *Attorney, Agent, or Firm* — Oliff & Berridge, PLC

(57) ABSTRACT

A power supply apparatus for a vehicle includes first and second batteries provided electrically in parallel to main loads, a boost converter provided between the first battery and the main loads, a boost converter provided between the second battery and the main loads, an auxiliary battery, a DC/DC converter, and an auxiliary load driven by power from the auxiliary battery or DC/DC converter. The controller determines charging currents or discharging currents for the batteries reflecting variations in a current flowing through the auxiliary load. Accordingly, a power supply apparatus for a vehicle can thus be provided in which imbalance between charging/discharging currents for a plurality of power storage devices is reduced.

8 Claims, 7 Drawing Sheets

POWER SUPPLY APPARATUS FOR VEHICLE

TECHNICAL FIELD

The present invention relates to a power supply apparatus for a vehicle, and more particularly to a power supply apparatus for a vehicle having a plurality of power storage devices mounted thereon.

BACKGROUND ART

Electric vehicles, hybrid vehicles, fuel cell vehicles, and the like have recently been developed and put into practical use as environmentally friendly vehicles. Such vehicles have mounted thereon a motor and a power supply apparatus for driving the motor.

Mounting a plurality of batteries on such vehicles is under consideration for the purpose of increasing an allowed running distance only by means of the batteries.

Japanese Patent Laying-Open No. 2002-10502 discloses a charge and discharge device for batteries that can charge and discharge a plurality of batteries simultaneously.

For electric vehicles, it is desirable that an allowed running distance on a single charge is long. For hybrid vehicles having mounted thereon an internal combustion engine, a battery and a motor, it is also desirable that the allowed running distance on a single charge without employing the internal combustion engine is long, when the hybrid vehicles are configured such that the battery is rechargeable from an external source.

To increase the allowed running distance on a single charge, the amount of energy of batteries mounted on the vehicle needs to be increased. Increase in the amount of energy can be achieved by: 1) increasing the energy capacity per battery cell; or 2) increasing the number of battery cells mounted.

With the above technique 1), it is difficult to ensure a desired amount of energy due to the presence of the upper limit of strength of a case for a battery cell. The technique 2) may be achieved by increasing the number of cells in series or in parallel.

Increasing the number of cells in series results in a high voltage. However, increasing the number of cells in series is restricted by the upper limit of withstand voltages of an inverter, a motor and the like which are electric loads. In contrast, connecting battery cells in parallel, without the provision of a power adjustment device, will deteriorate some of the batteries, although the required capacity can be ensured. This means that the capability of the mounted batteries cannot be fully utilized.

Further, vehicles having a wheel-driving motor mounted thereon are usually equipped with an auxiliary battery for driving an auxiliary load, in addition to a high-voltage battery of several hundred volts for driving the motor.

Charging the auxiliary battery and supplying power to the auxiliary load may be carried out at a voltage obtained by down-converting the voltage at the high-voltage battery by a DC/DC converter.

In this case, however, mounting a plurality of high-voltage batteries for increasing the allowed running distance will require some measures to be taken for balanced charging of the plurality of high-voltage batteries because one of the high-voltage batteries is required to supply power to the auxiliary load as well.

DISCLOSURE OF THE INVENTION

It is an object of the present invention to provide a power supply apparatus for a vehicle having a plurality of power storage devices mounted thereon in which charge/discharge imbalance among the plurality of power storage devices is reduced.

In summary, the present invention is directed to a power supply apparatus for a vehicle including first and second power storage devices provided electrically in parallel to a main load, a first power converter provided between the first power storage device and the main load, a second power converter provided between the second power storage device and the main load, a third power converter receiving a current divided from a path connecting the first power converter and the first power storage device, an auxiliary load driven by power from the third power converter, and a controller controlling the first to third power converters. The controller determines charging/discharging currents for the first and second power storage devices reflecting variations in a current flowing through the auxiliary load to control the first power converter and/or second power converter such that the determined currents are charged/discharged.

Preferably, the power supply apparatus for a vehicle further includes a battery charger for charging the first and second power storage devices by power received from a source external to the vehicle. The battery charger is connected to the first power storage device. The first and second power converters divide part of a current received from the battery charger to operate as another battery charger charging the second power storage device.

More preferably, the power supply apparatus for a vehicle further includes a current sensor detecting the charging/discharging current for the first power storage device. The controller suspends the third power converter temporarily to calculate a current divided toward the third power converter based on the difference in the charging/discharging current for the first power storage device before and after the suspension, and corrects an operation of the first and second power converters based on the divided current.

Still more preferably, the first power converter boosts a voltage from the first power storage device toward the main load during charging from the source external to the vehicle. The second power converter operates such that a constant current flows from the main load toward the second power storage device during charging from the source external to the vehicle.

Preferably, the controller calculates a current divided from a path connecting the first power converter and the first power storage device toward the third power converter when the controller assumes that power consumption in the auxiliary load has been varied.

More preferably, the controller assumes that power consumption in the auxiliary load has been varied at every elapse of a predetermined time.

More preferably, the controller assumes that power consumption in the auxiliary load has been varied when a difference between a state of charge of the first power storage device and a state of charge of the second power storage device exceeds a predetermined value.

Preferably, the controller calculates a state of charge of the first power storage device and a state of charge of the second power storage device to control the first to third power converters such that a difference between a state of charge of the first power storage device and a state of charge of the second power storage device is not increased.

According to the present invention, when a plurality of power storage devices are mounted, charge/discharge imbalance is reduced. This in result avoids such a state that some of the plurality of power storage devices have a shorter lifetime than the remaining power storage devices.

BEST MODES FOR CARRYING OUT THE INVENTION

Figure 1:
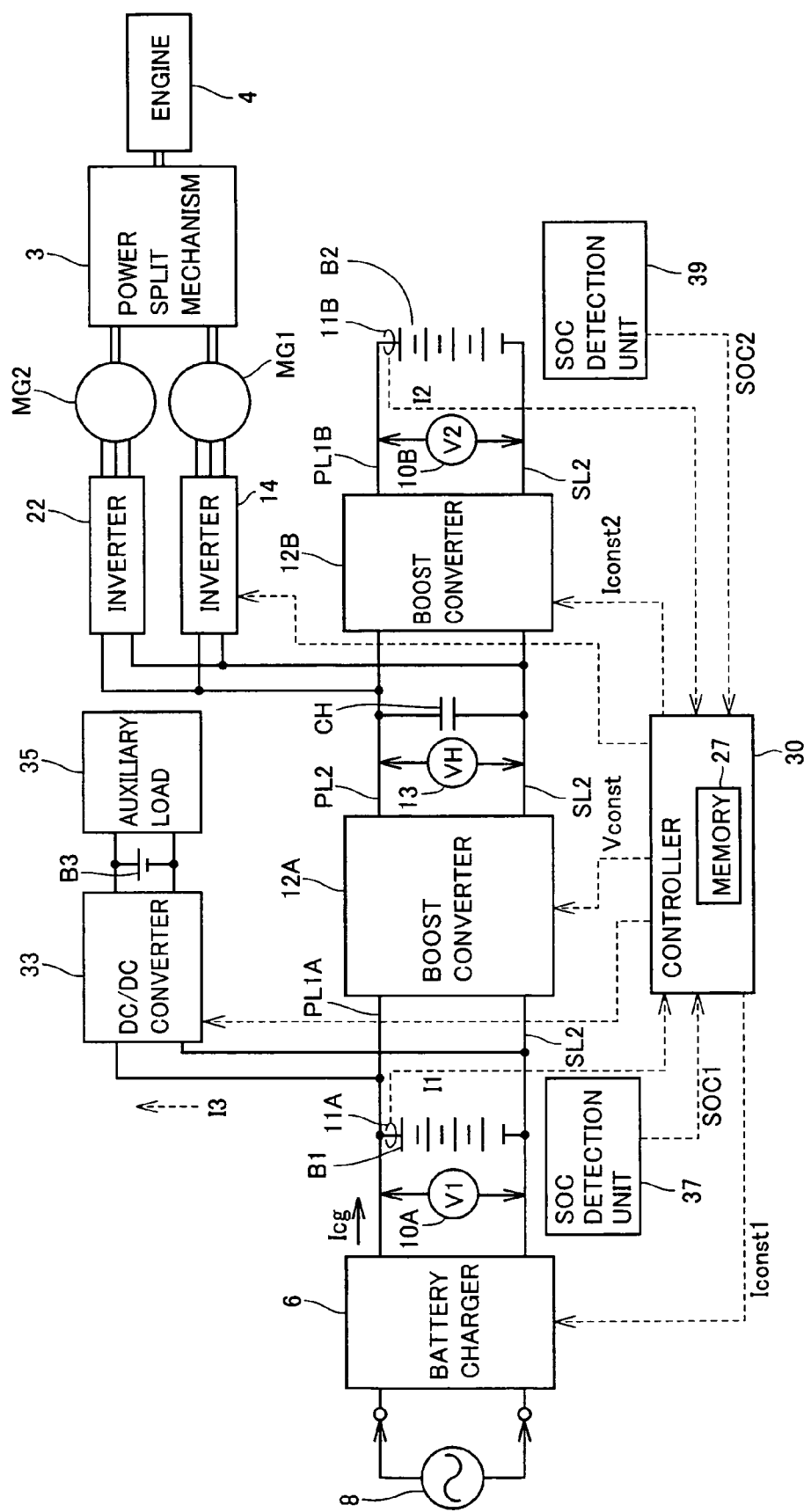
FIG. 1 illustrates a main configuration of a vehicle 1 according to an embodiment of the present invention.

In the following, an embodiment of the present invention will be described in detail with reference to the drawings. Like reference characters denote like or corresponding parts throughout the drawings, and description thereof will not be repeated.

First Embodiment

FIG. 1 illustrates a main configuration of a vehicle 1 according to an embodiment of the present invention.

Referring to FIG. 1, vehicle 1 includes batteries B1 and B2 as power storage devices, boost converters 12A and 12B as power converters, a smoothing capacitor CH, voltage sensors 10A, 10B and 13, inverters 14 and 22, an engine 4, motor generators MG1 and MG2, a power split mechanism 3, and a controller 30.

The power storage devices mounted on this vehicle are rechargeable from an external source. For this purpose, vehicle 1 further includes a battery charger 6 for connecting battery B1 to a commercial power supply 8 of AC 100V, for example. Battery charger 6 converts an alternating current into a direct current while regulating the voltage to be supplied to the batteries. To enable charging from an external source, other techniques may be employed such as connecting neutral points of stator coils of motor generators MG1 and MG2 to an AC power supply or causing boost converters 12A and 12B to cooperate as an AC-DC converting device.

Smoothing capacitor CH smoothes the voltage boosted by boost converters 12A and 12B. Voltage sensor 13 senses a voltage VH between terminals of smoothing capacitor CH for output to controller 30.

Inverter 14 converts a DC voltage received from boost converter 12B or 12A into a three-phase AC voltage for output to motor generator MG1. Inverter 22 converts a DC voltage received from boost converter 12B or 12A into a three-phase AC voltage for output to motor generator MG2.

Power split mechanism 3 is coupled to engine 4, motor generator MG1 and motor generator MG2 to distribute motive power among them. For example, as power split mechanism 3, a planetary gear mechanism having three rotation shafts of a sun gear, a planetary carrier and a ring gear can be used. In the planetary gear mechanism, when rotation of two of the three rotation shafts is determined, rotation of the other one of the rotation shafts is inevitably determined. These three rotation shafts are connected to the rotation shafts of engine 4, motor generator MG1, and motor generator MG2, respectively. The rotation shaft of motor generator MG2 is coupled to a wheel through a reduction gear and a differential gear not shown. A reduction gear device for the rotation shaft of motor generator MG2 may be incorporated into power split mechanism 3.

Voltage sensor 10A measures a voltage V1 between terminals of battery B1. To monitor the state of charge of battery B1 together with voltage sensor 10A, a current sensor 11A sensing a current I1 flowing through battery B1 is provided. A SOC detection unit 37 detecting SOC1 (SOC: State Of Charge) of battery B1 is also provided. SOC detection unit 37 calculates SOC based on accumulation of an open-circuit voltage of battery B1 and current I1 flowing through battery B1 for output to controller 30. As battery B1, a secondary battery of lead acid, nickel-metal hydride or lithium ion, a high-capacity capacitor such as an electric double layer capacitor, or the like can be used.

Voltage sensor 10B measures a voltage V2 between terminals of battery B2. Voltage sensor 10B measures a voltage V2 between terminals of battery B2. To monitor SOC of battery B2 together with voltage sensor 10B, a current sensor 11B sensing a current I2 flowing through battery B2 is provided. A SOC detection unit 39 detecting SOC2 of battery B2 is also provided. SOC detection unit 39 calculates SOC based on accumulation of an open-circuit voltage of battery B2 and current I2 flowing through battery B2 for output to controller 30. As battery B2, a secondary battery of lead acid, nickel-metal hydride or lithium ion, a high-capacity capacitor such as an electric double layer capacitor, or the like can be used.

Power storable capacities of batteries B2 and B1 are set in such a manner that batteries B2 and B1, when used simultaneously, for example, can output the maximum power allowed for electric loads (inverter 22 and motor generator MG2) connected to a power supply line. This enables maximum power traveling in EV (Electric Vehicle) traveling without employing the engine.

When the electric power of battery B2 has been consumed, engine 4 is employed in addition to battery B1, to thereby enable maximum power traveling without employing battery B2.

Inverter 14 is connected to a power supply line PL2 and a ground line SL2. Inverter 14 receives a voltage boosted by boost converters 12A and 12B to drive motor generator MG1 for starting engine 4, for example. Inverter 14 also returns electric power generated in motor generator MG1 based on mechanical power transferred from engine 4, back to boost converters 12A and 12B. At this stage, boost converters 12A and 12B are controlled by controller 30 so as to operate as step-down circuits.

Inverter 22 is connected to power supply line PL2 and ground line SL2 in parallel to inverter 14. Inverter 22 converts DC voltages received from boost converters 12A and 12B into three-phase AC voltages for output to motor generator MG2 that drives a wheel. Inverter 22 also returns electric power generated in motor generator MG2 following regenerative breaking, back to boost converters 12A and 12B. At this stage, boost converters 12A and 12B are controlled by controller 30 so as to operate as step-down circuits.

Controller 30 receives respective torque command values, motor current values and rotational speeds of motor generators MG1 and MG2, respective values of voltages V1, V2 and VH, and a start signal. Controller 30 then outputs a boost instruction, a down-convert instruction, and an operation disabling instruction to boost converter 12B.

Further, controller 30 outputs, to inverter 14, a drive instruction to convert a DC voltage received from boost converters 12A and 12B into an AC voltage for driving motor generator MG1 and a regeneration instruction to convert an AC voltage generated in motor generator MG1 into a DC voltage to be returned back to boost converters 12A and 12B.

Similarly, controller 30 outputs, to inverter 22, a drive instruction to convert a DC voltage into an AC voltage for driving motor generator MG2 and a regeneration instruction to convert an AC voltage generated in motor generator MG2 into a DC voltage to be returned back to boost converters 12A and 12B.

Further, an auxiliary battery B3 and DC/DC converter 33 for driving an auxiliary load 35 are provided. DC/DC converter 33 is connected to a power supply line PL1A and ground line SL2. During charging, part of a charging current Icg is divided, so that a current I3 is supplied to DC/DC converter 33.

Auxiliary load 35 includes, for example, power supplies for various types of ECUs (Electric Control Units), a headlight, a room lamp, a power window, a horn, a winker, and the like. Since these auxiliary loads are inevitably activated upon receipt of driving requests, it is not considered to monitor current I3 to limit the operations of the auxiliary loads. Therefore, in many cases, no current sensor for measuring current I3 is provided.

Figure 2:
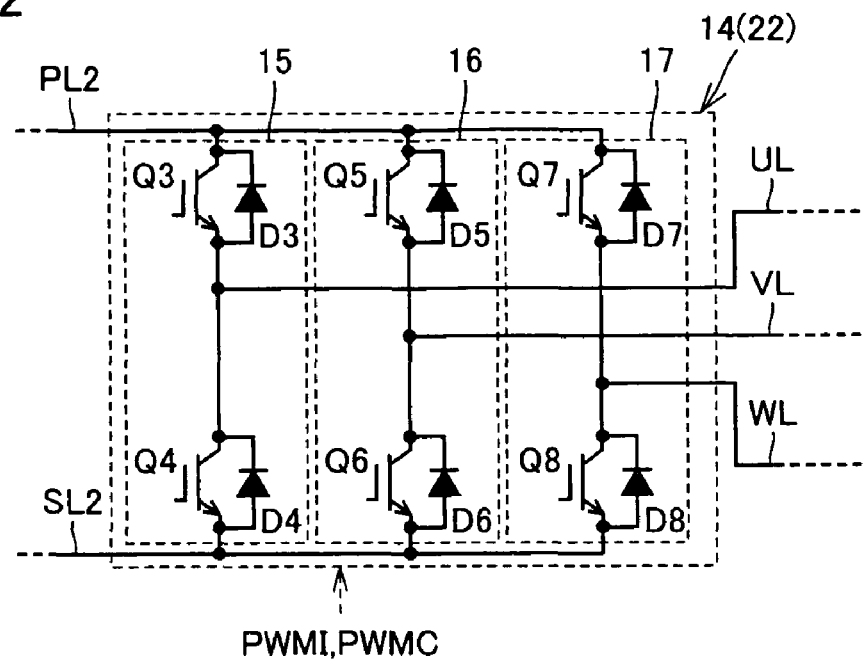
FIG. 2 is a circuit diagram showing a detailed configuration of inverters 14 and 22 shown in FIG. 1.

FIG. 2 is a circuit diagram showing a detailed configuration of inverters 14 and 22 shown in FIG. 1.

Referring to FIGS. 1 and 2, inverter 14 includes a U-phase arm 15, a V-phase arm 16, and a W-phase arm 17. U-phase arm 15, V-phase arm 16, and W-phase arm 17 are connected in parallel between power supply line PL2 and ground line SL2.

U-phase arm 15 includes IGBT elements Q3 and Q4 connected in series between power supply line PL2 and ground line SL2, and diodes D3 and D4 connected in parallel to IGBT elements Q3 and Q4, respectively. Diode D3 has its cathode connected to the collector of IGBT element Q3, and its anode connected to the emitter of IGBT element Q3. Diode D4 has its cathode connected to the collector of IGBT element Q4, and its anode connected to the emitter of IGBT element Q4.

V-phase arm 16 includes IGBT elements Q5 and Q6 connected in series between power supply line PL2 and ground line SL2, and diodes D5 and D6 connected in parallel to IGBT elements Q5 and Q6, respectively. Diode D5 has its cathode connected to the collector of IGBT element Q5, and its anode connected to the emitter of IGBT element Q5. Diode D6 has its cathode connected to the collector of IGBT element Q6, and its anode connected to the emitter of IGBT element Q6.

W-phase arm 17 includes IGBT elements Q7 and Q8 connected in series between power supply line PL2 and ground line SL2, and diodes D7 and D8 connected in parallel to IGBT elements Q7 and Q8, respectively. Diode D7 has its cathode connected to the collector of IGBT element Q7, and its anode connected to the emitter of IGBT element Q7. Diode D8 has its cathode connected to the collector of IGBT element Q8, and its anode connected to the emitter of IGBT element Q8.

The respective phase arms have their intermediate nodes connected to phase terminals of phase coils of motor generator MG1, respectively. Specifically, motor generator MG1 is a three-phase permanent magnet synchronous motor, and the three U-, V-, and W-phase coils have their one ends connected in common to a neutral point. The U-phase coil has the other end connected to a line UL routed from a connection node between IGBT elements Q3 and Q4. The V-phase coil has the other end connected to a line VL routed from a connection node between IGBT elements Q5 and Q6. The W-phase coil has the other end connected to a line WL routed from a connection node between IGBT elements Q7 and Q8.

Inverter 22 shown in FIG. 1 is similar to inverter 14 in internal circuit configuration with the exception that it is connected to motor generator MG2. Accordingly, a detailed description thereof will not be repeated. Control signals PWMI and PWMC shown in FIG. 2 as being supplied to the inverter are signals corresponding to the drive instruction and regeneration instruction, respectively.

Figure 3:
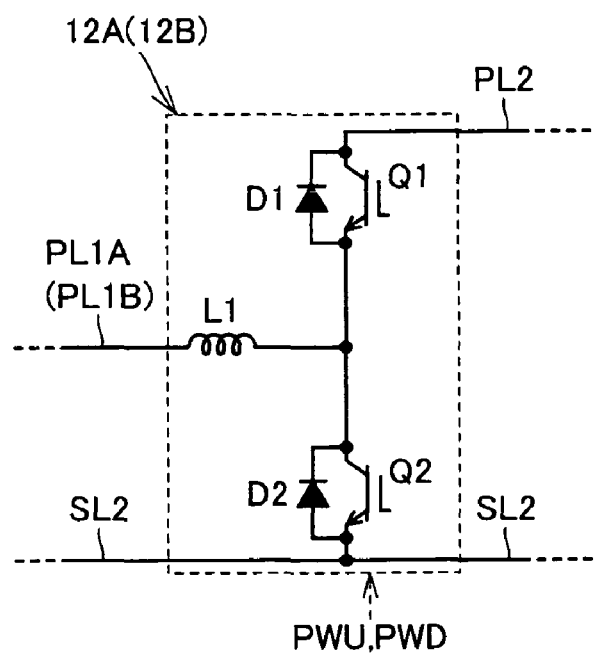
FIG. 3 is a circuit diagram showing a detailed configuration of boost converters 12A and 12B shown in FIG. 1.

FIG. 3 is a circuit diagram showing a detailed configuration of boost converters 12A and 12B shown in FIG. 1.

Referring to FIGS. 1 and 3, boost converter 12A includes a reactor L1 with one end connected to power supply line PL1A, IGBT elements Q1 and Q2 connected in series between power supply line PL2 and ground line SL2, and diodes D1 and D2 connected in parallel to IGBT elements Q1 and Q2, respectively.

Reactor L1 has the other end connected to the emitter of IGBT element Q1 and the collector of IGBT element Q2. Diode D1 has its cathode connected to the collector of IGBT element Q1, and its anode connected to the emitter of IGBT element Q1. Diode D2 has its cathode connected to the collector of IGBT element Q2, and its anode connected to the emitter of IGBT element Q2.

Boost converter 12B shown in FIG. 1 is similar to boost converter 12A in internal circuit configuration with the exception that it is connected to a power supply line PL1B instead of power supply line PL1A. Accordingly, a detailed description thereof will not be repeated. Control signals PWU and PWD shown in FIG. 3 as being supplied to the boost converter are signals corresponding to the boost instruction and down-convert instruction, respectively.

Referring again to FIG. 1, an operation of the power supply apparatus for a vehicle according to the present embodiment will be described.

The power supply apparatus for a vehicle disclosed in FIG. 1 includes first and second power storage devices (B1, B2) provided electrically in parallel to main loads (14, 22), a first power converter (12A) provided between the first power storage device (B1) and the main loads, a second power converter (12B) provided between the second power storage device (B2) and the main loads, an auxiliary power storage device (B3), a third power converter (33) charging the auxiliary power storage device by current I3 divided from a path connecting the first power converter and the first power storage device, auxiliary load 35 driven by electric power from the auxiliary power storage device (B3) or third power converter (33), and controller 30 controlling the first to third power converters (12A, 12B, 33). Controller 30 determines charging current or discharging currents for the first and second power storage devices (B1, B2) reflecting variations in a current flowing through auxiliary load 35.

Preferably, the power supply apparatus for a vehicle further includes battery charger 6 for charging the first and second power storage devices (B1, B2) by electric power received from a source external to the vehicle. Battery charger 6 is connected to the first power storage device (B1). The first and second power converters (12A, 12B) operate as another battery charger for dividing part of a current received from battery charger 6 for charging the second power storage device (12B).

More preferably, the power supply apparatus for a vehicle further includes current sensor 11A detecting the charging current and discharging current for the first power storage device (B1). Controller 30 suspends the third power converter (33) temporarily to calculate the current (I3) divided toward the third power converter (33) based on the difference in charging current and discharging current for first power storage device (B1) before and after the suspension of the third power converter (33). The operations of the first and second power converters are corrected based on the divided current.

Still more preferably, during charging from a source external to the vehicle, the first power converter (12A) performs a boost operation from the first power storage device (B1) toward the main loads (14, 22). During charging from a source external to the vehicle, the second power converter (12B) operates such that a current (Iconst2) flows from the main loads (14, 22) toward the second power storage device (B2).

Preferably, when it is assumed that power consumption in auxiliary load 35 has been varied, controller 30 calculates current I3 divided from the path connecting the first power converter (12A) and the first power storage device (B1) toward the third power converter (33).

Figure 4:
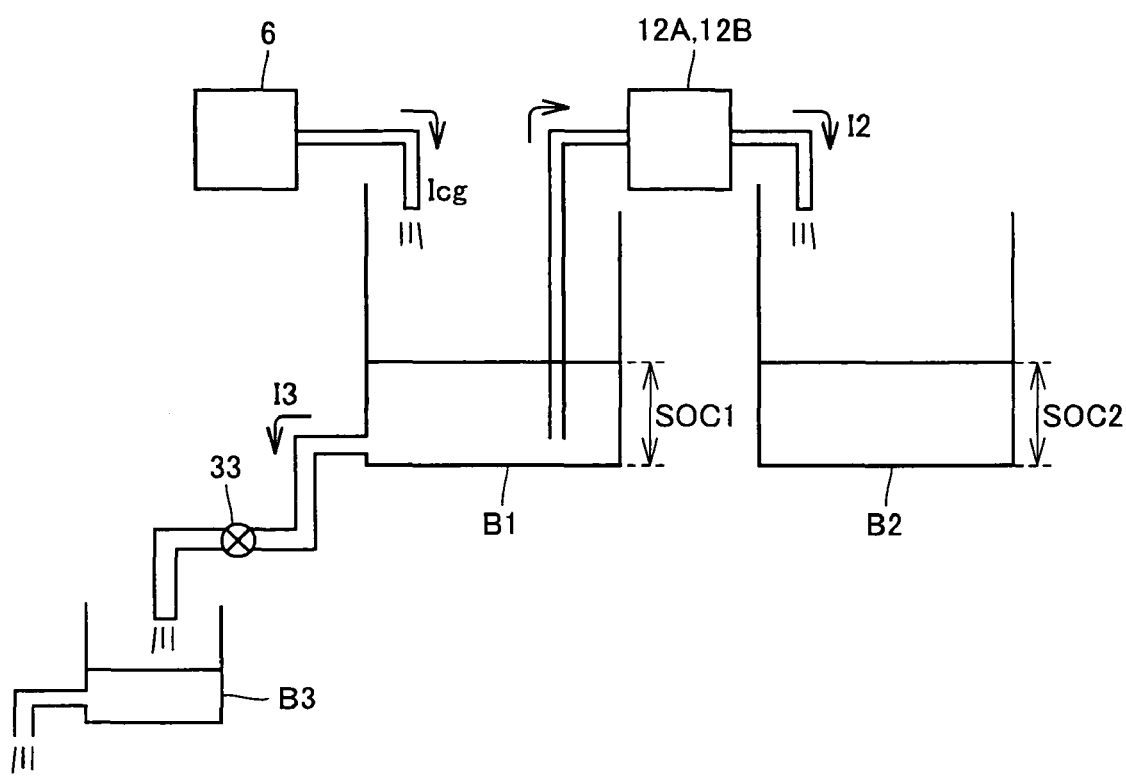
FIG. 4 is a schematic diagram to describe the state of a power supply apparatus for a vehicle during charging.

FIG. 4 is a schematic diagram to describe the state of the power supply apparatus for a vehicle during charging.

In FIG. 4, the current is schematically represented as a stream of water. Charging current Icg flows out of battery charger 6 into a tank corresponding to battery B1. Boost converters (12A, 12B) cooperate as a battery charger for battery B2 to supply current I2 from battery B1 to battery B2.

Also flown out of battery B1 is current I3 for the auxiliary load. Current I3 is supplied to battery B3 by a flow-rate regulation valve corresponding to DC/DC converter 33. Battery B3 supplies the same amount of current I3 as received, to the auxiliary load.

In such a system, consider charging in which SOC of batteries B1 and B2 is increased by the same amount. However, a current to be supplied to a load operated by driver's request, such as a headlight or a horn, may be required in addition to a consumption current of various ECUs being activated during charging and a reference current determined based on the loss of DC/DC converter 33. In other words, current I3 may be varied.

When such variation occurs, charge imbalance will take place between batteries B1 and B2 if current I2 is kept constant. A possible consideration in such case is that imbalance in the course of charging would be acceptable when charging of one of the batteries having been fully charged earlier is stopped while the other battery is kept charged so that batteries B1 and B2 are both finally brought into the fully-charged state. However, the time for charging the batteries may be a short period of time according to user's circumstances, which means that a charging time long enough to fully charge both batteries B1 and B2 may not necessarily be given. Repeating short-period charging from an external source will cause charge/discharge imbalance between batteries B1 and B2, so that one of the batteries may have a shorter lifetime than the other one.

Accordingly, it is desirable that batteries B1 and B2 should be charged so as to attain the best possible balance even during charging. For balanced charging of batteries B1 and B2, current I2 supplied to battery B2 also needs to be varied according to variations in current I3 supplied to the auxiliary load, when charging current Icg is constant.

Figure 5:
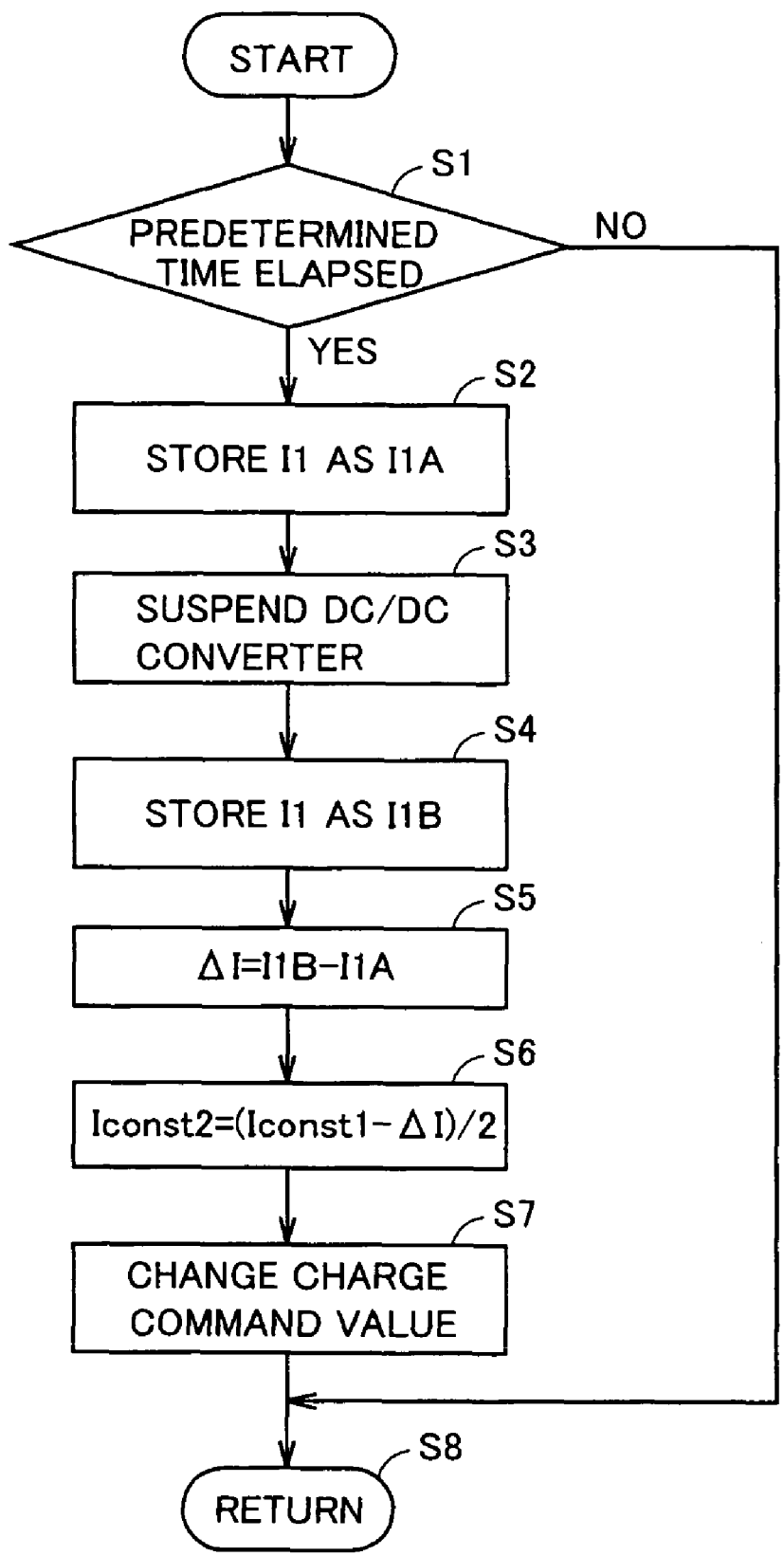
FIG. 5 is a flow chart to describe charging control executed by controller 30 shown in FIG. 1.

FIG. 5 is a flow chart to describe charging control executed by controller 30 shown in FIG. 1. The process in this flow chart is invoked from a main routine and executed at regular time intervals or each time predetermined conditions are met.

Referring to FIGS. 1 and 5, when the process in this flow chart is started, it is determined whether or not a predetermined time T has passed in step S1. If predetermined time T has not passed, the process proceeds into step S8, where the control is transferred to the main routine.

When it is determined that the predetermined time has passed in step S1, current I1 detected by current sensor 11A at this stage is stored in a memory 27 within controller 30 as a current value I1A in step S2. The process then proceeds into step S3.

In step S3, controller 30 suspends DC/DC converter 33 temporarily. By this stage, DC/DC converter 33 is controlled to convert the voltage at battery B1 (e.g., 200V) into a certain output voltage (e.g., 14V) for supplying a charging voltage to auxiliary battery B3 that provides a supply voltage to auxiliary load 35.

Under such control, current I3 supplied to DC/DC converter 33 becomes a value reflecting the consumption current of the auxiliary load, when auxiliary battery B3 is in a fully-charged state. Accordingly, current I3 can be identified by monitoring variations in charging current before and after the suspension of DC/DC converter 33 without having to provide a current sensor for measuring current I3.

Figure 6:
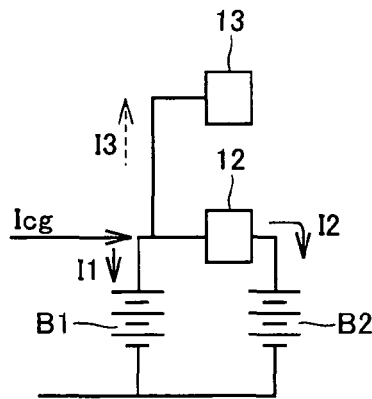
FIG. 6 is a diagram to describe variations in charging current before and after suspension of a DC/DC converter 33.

FIG. 6 is a diagram to describe variations in charging current before and after the suspension of DC/DC converter 33.

In FIG. 6, charging current Icg received from the battery charger is a value (constant value Iconst1) determined in principle by the limit of capacity of battery charger 6. Charging current I2 for battery B2 is controlled by a battery charger 12 for battery B2 formed by boost converters 12A and 12B.

Here, boost converter 12A boosts the voltage at power supply line PL1A, for example, 200V for output to power supply line PL2. The voltage at power supply line PL2 is 600V, for example. In such case, boost converter 12B operates as a step-down circuit down-converting the voltage at power supply line PL2 (e.g., 600V) to the voltage at power supply line PL1B (e.g., 200V). Boost converter 12B operating as the step-down circuit receives a constant-current control command value to be controlled such that the charging current becomes constant value Iconst2.

In FIG. 6, assuming that the voltages at batteries B1 and B2 are controlled to be substantially equal, the following equation (1) holds:

$$Icg = I1 + I2 + I3 \tag{1}$$

Since Icg is controlled to be constant current Iconst1 and I2 is controlled to be Iconst2, the following equations (2) and (3) hold, assuming that current value I1 before the suspension of DC/DC converter is I1A and current value I1 after the suspension (I3=0) is I1B:

$$Iconst1 = I1A + Iconst2 + I3 \tag{2}$$

$$Iconst1 = I1B + Iconst2 \tag{3}$$

The equations (2) and (3) show that the following equation (4) holds:

$$I3 = I1B - I1A \tag{4}$$

Referring again to FIGS. 1 and 5, after suspending DC/DC converter 33 in step S3, current value I1 measured by current sensor 11A is stored in memory 27 as current value I1B in step S4. Further, in step S5, a difference ΔI=I1B−I1A between current value I1A stored in step S2 and current value I1B stored in step S4 is calculated. This difference is equal to current I3 having been supplied to DC/DC converter 33, as can be seen from the above equation (4).

Thereafter, in step S6, a charge command value for battery B2 is calculated in accordance with the following equation (5) to be updated in step S7:

$$Iconst2=(Iconst1-\Delta I)/2 \qquad (5)$$

Updating the command value for boost converter 12B in this manner allows current I1 charged into battery B1 and current I2 charged into battery B2 to be set equally even after the consumption current of the auxiliary loads has been varied.

Figure 7:
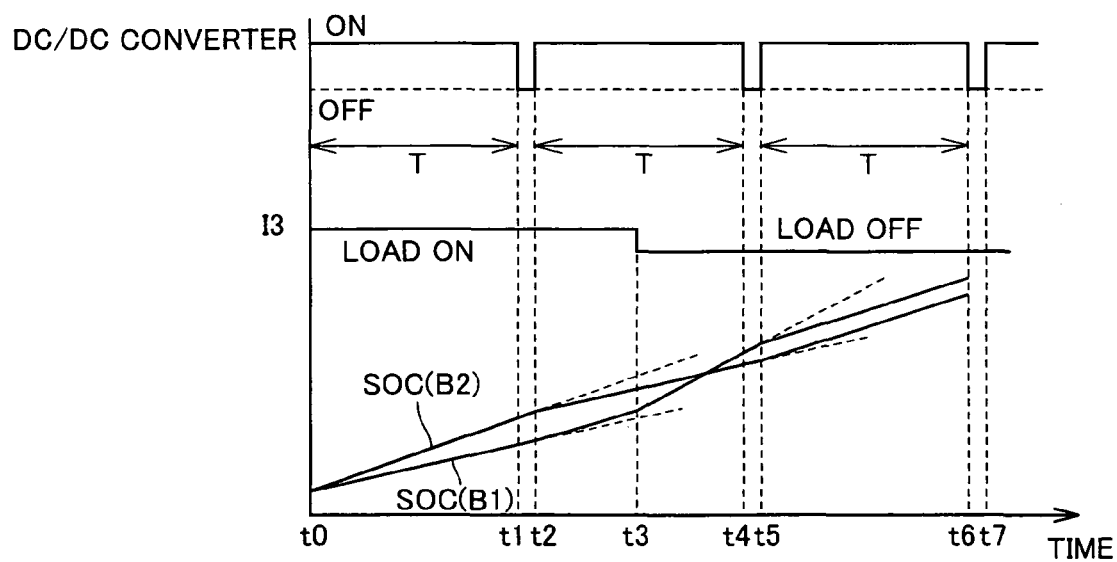
FIG. 7 is an operational waveform diagram showing an example where control is effected based on the flow chart of FIG. 5.

FIG. 7 is an operational waveform diagram showing an example where control is effected based on the flow chart of FIG. 5.

Referring to FIGS. 1 and 7, part of the auxiliary loads (e.g., headlight) is ON between time t0 and time t3, which means current I3 is larger than a standard value.

Since the charge command value Iconst2 is set based on the standard value of current I3, the rate of increase in SOC (B1) of battery B1 is lower than in SOC (B2) of battery B2 between time t0 and time t1. Continuing charging at these rates, the SOC difference between batteries B1 and B2 will become greater increasingly, as indicated by the dotted lines.

Accordingly, as shown in FIG. 7, controller 30 assumes that power consumption of the auxiliary load 35 has been varied each time predetermined time T has passed. Then, controller 30 suspends DC/DC converter 33 temporarily for measuring the consumption current of auxiliary load 35.

The operation of DC/DC converter 33 is suspended temporarily from time t1 to time t2 after the elapse of constant time T. From time t1 to time t2, auxiliary load 35 receives a current from auxiliary battery B3. Then, steps S2 to S7 in the flow chart of FIG. 5 are executed to change the charge command value, as a result of which the SOC difference does not increase between time t2 and t3, as indicated by the solid line.

At time t3, when part of the auxiliary loads is set OFF, current I3 is reduced by that amount. This causes the charging current for battery B1 to increase, so that the rate of increase in SOC (B1) will be higher than in SOC (B2). Continuing charging at these rates, the SOC of battery B1 will exceed that of battery B2 as indicated by the dotted lines, causing the difference therebetween to be increased.

However, DC/DC converter 33 is suspended again from time t4 to time t5 after constant time T has elapsed from time t2. Current I3 is detected at this stage to update the charge command value based on the result of detection. After time t5, charging proceeds in such a manner that the SOC difference between batteries B1 and B2 is not increased.

While suspending DC/DC converter 33, discharging of auxiliary battery B3 advances in order to supply the consumption current to auxiliary load 35 during the suspension. However, auxiliary battery B3 is brought into substantially a fully-charged state again during constant time T. Thus, current I3 does not include the charging current for charging battery B3 next time when DC/DC converter 33 is suspended to measure current I3.

As described above, temporarily suspending DC/DC converter 33 to measure current I3 based on variations in charging currents for batteries B1 and B2 at that stage eliminates the need to provide an additional current sensor for measuring current I3. This can prevent increase in manufacturing costs.

Second Embodiment

In the first embodiment, current I3 is measured each time a constant time period has elapsed. In the second embodiment, current I3 is measured when the SOC difference between batteries B1 and B2 exceeds a predetermined value to correct charging currents for batteries B1 and B2. Since the vehicle is configured as shown in FIG. 1, description thereof will not be repeated.

Figure 8:
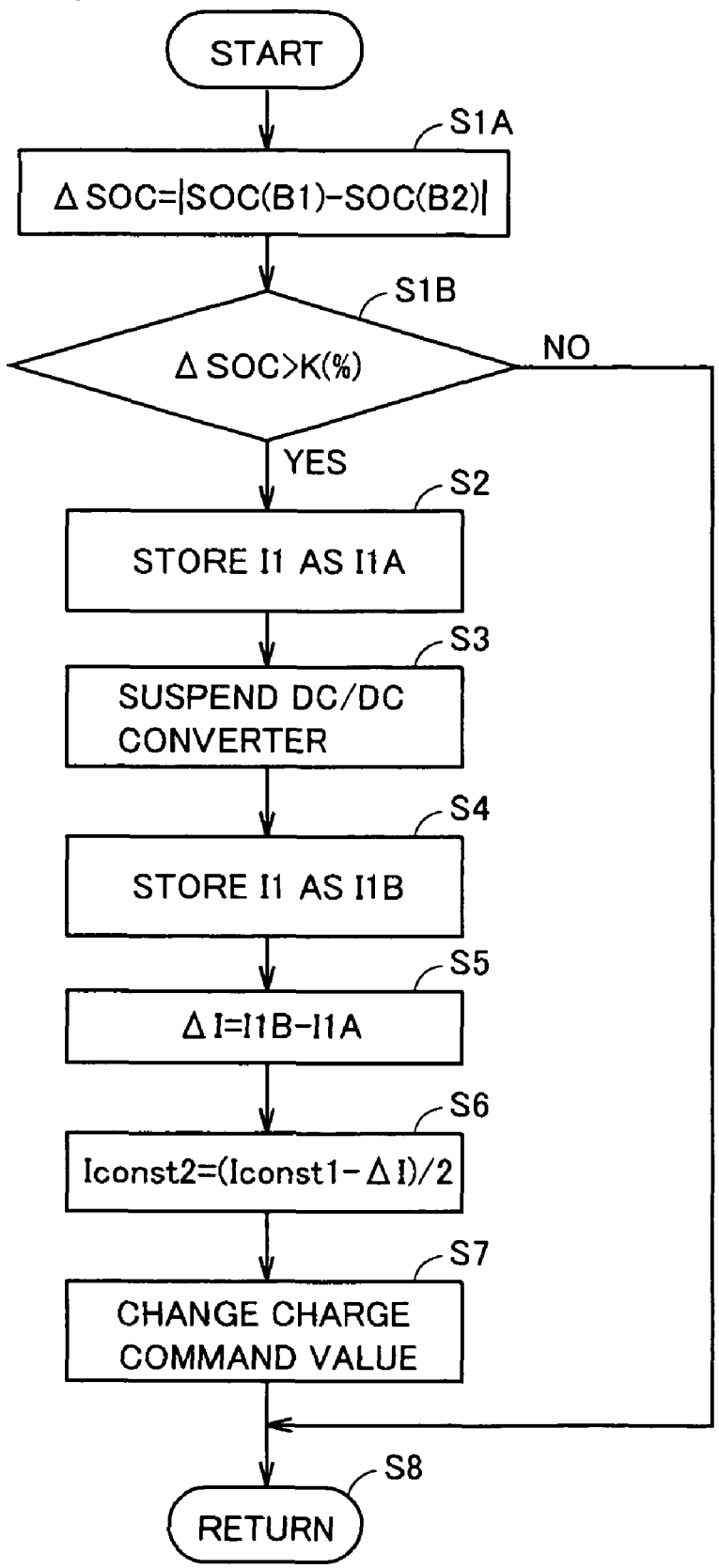
FIG. 8 is a flow chart to describe charging control executed by controller 30 shown in FIG. 1 according to a second embodiment.

FIG. 8 is a flow chart to describe charging control executed by controller 30 shown in FIG. 1 according to the second embodiment. The process in this flow chart is invoked from a main routine and executed at regular time intervals or each time predetermined conditions are met.

The flow chart of FIG. 8 differs from that of FIG. 5 in that steps S1A and S1B are executed instead of step S1 in the flow chart of FIG. 5.

Referring to FIGS. 1 and 8, when the process in this flow chart is started, an absolute value of the difference between SOC (B1) of battery B1 and SOC (B2) of battery B2 is obtained as ΔSOC in step S1A. Then, it is determined whether or not ΔSOC is larger than a predetermined threshold value K (%) in step S1B.

If ΔSOC>K does not hold, the process proceeds to step S8, where the control is transferred to the main routine. When ΔSOC>K holds, steps S2 to S7 are sequentially executed. Steps S2 to S7 are similar to those of FIG. 5 according to the first embodiment, and description thereof will not be repeated.

Figure 9:
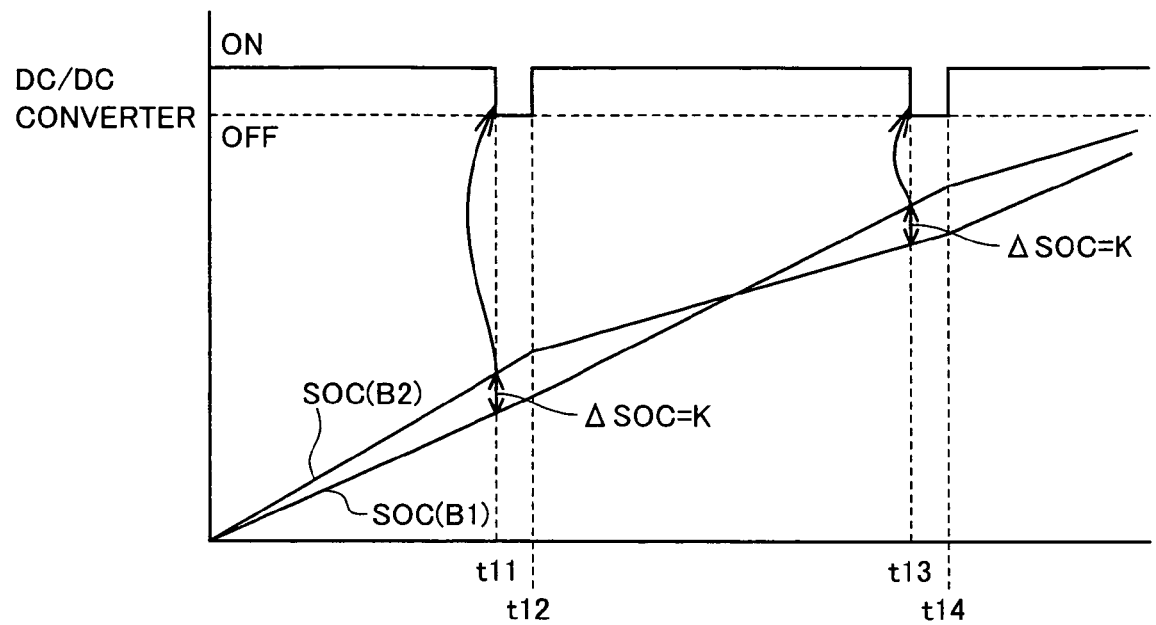
FIG. 9 is an operational waveform diagram showing an example where control is effected based on the flow chart of FIG. 8.

FIG. 9 is an operational waveform diagram showing an example where control is effected based on the flow chart of FIG. 8.

Referring to FIGS. 1 and 9, since the difference ΔSOC between SOC (B1) of battery B1 and SOC (B2) of battery B2 does not exceed threshold value K before time t11, DC/DC converter 33 is set ON to perform a normal operation.

At time t11 when the difference ΔSOC exceeds threshold value K (%), controller 30 suspends DC/DC converter 33 temporarily from time t11 to time t12. During this period, the imbalance between charging currents for batteries B1 and B2 is corrected. The SOC difference ΔSOC is thus prevented from exceeding threshold value K.

With the correction, the SOC increase rate (inclination of graph) is changed before and after time t12.

At time t13 when ΔSOC exceeds threshold value K again, controller 30 suspends DC/DC converter 33 temporarily from time t13 to time t14. During this period, the imbalance between charging currents for batteries B1 and B2 is corrected. The SOC difference ΔSOC is thus prevented from exceeding threshold value K.

With the correction, the SOC increase rate (inclination of graph) is changed before and after time t14.

As described above, in the second embodiment, controller 30 calculates SOC (B1) of the first storage device (B1) and SOC (B2) of the second storage device (B2) (in step S1A) to control the first to third power converters (12A, 12B, 33) such that the SOC difference ΔSOC between the first and second storage devices is not increased.

As shown in FIG. 9, controller 30 assumes that the power consumption in auxiliary loads 35 has been varied when the SOC difference ΔSOC between the first and second storage devices (B1, B2) exceeds threshold value K (%). Controller 30 then detects variations in power consumption to reset a charging-current command value according to the result of detection. This can reduce charge imbalance between the batteries, which can avoid such a state that one of the batteries has a shorter lifetime than the other battery.

In the first and second embodiments, vehicle 1 shown in FIG. 1 may be provided with a current sensor that directly measures current I3. In this case, batteries B1 and B2 can also be charged in a balanced manner by correcting the charging currents at regular time intervals or each time predetermined conditions are met such that the difference in charging currents for batteries B1 and B2 will disappear.

Further, in the first and second embodiments, charging current Iconst2 for charging battery B2 is corrected. Alternatively, these embodiments may be varied such that charging current Iconst1 from battery charger 6 is increased or decreased according to variations in consumption power of auxiliary loads while Iconst2 is kept constant.

The present embodiment has described, by way of example, correcting the charging currents during charging from an external source. Alternatively, the charging currents may be corrected similarly in the case of operating a generator for charging during traveling or in the case of performing charging by generating power during regenerative breaking.

Further, when a plurality of batteries are discharged instead of being charged, SOC imbalance among the plurality of batteries can also be reduced during discharging by similarly correcting the discharging currents reflecting the consumption power in the auxiliary loads.

The embodiment of the present invention is based on a hybrid vehicle, by way of example. Alternatively, the present invention may also be applied to various types of hybrid vehicles, electric vehicles, and the like having a plurality of batteries mounted thereon.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:

1. A power supply apparatus for a vehicle, comprising:
   first and second power storage devices provided electrically in parallel to a main load;
   a first power converter provided between said first power storage device and said main load;
   a second power converter provided between said second power storage device and said main load;
   a third power converter receiving a current divided from a path connecting said first power converter and said first power storage device;
   an auxiliary load driven by power from said third power converter; and
   a controller controlling said first to third power converters, wherein
   said controller determines charging/discharging currents for said first and second power storage devices reflecting variations in a current flowing through said auxiliary load to control said first power converter and/or second power converter such that the determined currents are charged/discharged.

2. The power supply apparatus for a vehicle according to claim 1, further comprising a battery charger for charging said first and second power storage devices by power received from a source external to the vehicle, wherein
   said battery charger is connected to said first power storage device, and
   said first and second power converters divide part of a current received from said battery charger to operate as another battery charger charging said second power storage device.

3. The power supply apparatus for a vehicle according to claim 2, further comprising a current sensor detecting the charging/discharging current for said first power storage device, wherein
   said controller suspends said third power converter temporarily to calculate a current divided toward said third power converter based on the difference in the charging/discharging current for said first power storage device before and after the suspension, and corrects an operation of said first and second power converters based on said divided current.

4. The power supply apparatus for a vehicle according to claim 3, wherein
   said first power converter boosts a voltage from said first power storage device toward said main load during charging from the source external to the vehicle, and
   said second power converter operates such that a constant current flows from said main load toward said second power storage device during charging from the source external to the vehicle.

5. The power supply apparatus for a vehicle according to claim 1, wherein said controller calculates a current divided from a path connecting said first power converter and said first power storage device toward said third power converter when said controller assumes that power consumption in the auxiliary load has been varied.

6. The power supply apparatus for a vehicle according to claim 5, wherein said controller assumes that power consumption in said auxiliary load has been varied at every elapse of a predetermined time.

7. The power supply apparatus for a vehicle according to claim 5, wherein said controller assumes that power consumption in said auxiliary load has been varied when a difference between a state of charge of said first power storage device and a state of charge of said second power storage device exceeds a predetermined value.

8. The power supply apparatus for a vehicle according to claim 1, wherein said controller calculates a state of charge of said first power storage device and a state of charge of said second power storage device to control said first to third power converters such that a difference between a state of charge of said first power storage device and a state of charge of said second power storage device is not increased.

\* \* \* \* \*